United States Patent
Jung et al.

(10) Patent No.: US 12,278,937 B2
(45) Date of Patent: Apr. 15, 2025

(54) METHOD AND DEVICE FOR PROCESSING MULTI-VIEW VIDEO DATA

(71) Applicant: ORANGE, Issy-les-Moulineaux (FR)

(72) Inventors: Joël Jung, Châtillon (FR); Pavel Nikitin, Châtillon (FR); Patrick Garus, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 279 days.

(21) Appl. No.: 17/622,486

(22) PCT Filed: Jun. 11, 2020

(86) PCT No.: PCT/EP2020/066203
§ 371 (c)(1),
(2) Date: Dec. 23, 2021

(87) PCT Pub. No.: WO2020/260034
PCT Pub. Date: Dec. 30, 2020

(65) Prior Publication Data
US 2022/0247989 A1    Aug. 4, 2022

(30) Foreign Application Priority Data
Jun. 27, 2019   (FR) ...................................... 1907043

(51) Int. Cl.
*H04N 13/156*   (2018.01)
*H04N 13/161*   (2018.01)

(52) U.S. Cl.
CPC ......... *H04N 13/156* (2018.05); *H04N 13/161* (2018.05)

(58) Field of Classification Search
CPC .. H04N 13/156; H04N 13/161; H04N 13/268; H04N 5/265; H04N 19/42
See application file for complete search history.

(56) References Cited

U.S. PATENT DOCUMENTS

| 2014/0085416 A1* | 3/2014 | Chang | .................. | H04N 19/503 |
| | | | | 348/43 |
| 2015/0085933 A1* | 3/2015 | Yie | ...................... | H04N 19/117 |
| | | | | 375/240.16 |

(Continued)

OTHER PUBLICATIONS

Patrick Garus, Jung Joel, Thomas Maugey, Christine Guillemot, Bypass Depth Maps Transmission For Immersive Video Coding (Immersion Video Coding bypassing Depth Diagram), PCS 2019—image coding seminar, Nov. 2019, China Ningbo, 1-5 page, hal-02397800 (Year: 2019).*

(Continued)

*Primary Examiner* — James M Pontius
(74) *Attorney, Agent, or Firm* — David D. Brush; Westman, Champlin & Koehler, P.A.

(57) ABSTRACT

A method and a device for processing multi-view video data. The multi-view video data includes at least one part of a decoded image of at least one view of the multi-view video, from an encoded data stream representative of the multi-view video. At least one item of data, referred to as synthesis data, is obtained from at least the one part of the decoded image, and at least one image of an intermediate view of the multi-view video not encoded in the encoded data stream is synthesized from at least the one part of the decoded image and from the synthesis data obtained.

13 Claims, 7 Drawing Sheets

(56) References Cited

U.S. PATENT DOCUMENTS

2015/0341614 A1* 11/2015 Senoh .................. H04N 13/161
                       348/43
2020/0120324 A1* 4/2020 Kwong .................. G06T 5/006

OTHER PUBLICATIONS

International Search Report dated Aug. 25, 2020 for corresponding International Application No. PCT/EP2020/066203, Jun. 11, 2020.
Written Opinion of the International Searching Authority dated Aug. 25, 2020 for corresponding International Application No. PCT/EP2020/066203, filed Jun. 11, 2020.
Brites Catarina et al., "Epipolar plane image based rendering for 3D video coding", 2015 IEEE 17th International Workshop on Multimedia Signal Processing (MMSP), IEEE, Oct. 19, 2015 (Oct. 19, 2015), pp. 1-6, DOI: 10.1109/MMSP.2015.7340854, XP032822581.
Wang Kaixuan et al., "MVDepthNet: Real-Time Multiview Depth Estimation Neural Network", 2018 International Conference on 3D Vision (3DV), IEEE, Sep. 5, 2018 (Sep. 5, 2018), pp. 248-257, DOI: 10.1109/3DV.2018.00037, XP033420063.
Ding X. et al., "Underwater image dehaze using scene depth estimation with adaptive color correction", IEEE, 2017.
English translation of the Written Opinion of the International Searching Authority dated Sep. 2, 2020 for corresponding International Application No. PCT/EP2020/066203, filed Jun. 11, 2020.
English translation of Written Opinion of the French Searching Authority for corresponding French Application No. 1907043, filed Jun. 27, 2019.

* cited by examiner

METHOD AND DEVICE FOR PROCESSING MULTI-VIEW VIDEO DATA

CROSS-REFERENCE TO RELATED APPLICATIONS

This Application is a Section 371 National Stage Application of International Application No. PCT/EP2020/066203, filed Jun. 11, 2020, which is incorporated by reference in its entirety and published as WO 2020/260034 A1 on Dec. 30, 2020, not in English.

1. FIELD OF THE INVENTION

The invention relates to immersive videos, representative of a scene captured by one or more cameras, including the videos for virtual reality and free navigation. More particularly, the invention relates to the processing (encoding, decoding, synthesis of intermediate views) of data from such videos.

2. PRIOR ART

An immersive video allows a viewer to watch a scene from any viewpoint, even from a viewpoint that has not been captured by a camera. A typical acquisition system is a set of cameras that captures a scene with several cameras located outside the scene or with divergent cameras built on a spherical platform, located inside the scene. The videos are usually displayed via virtual reality headsets (also known as head-mounted devices, or HMDs), but can also be displayed on 2D screens with an additional system to interact with the user. Free navigation in a scene requires that every movement of the user is properly managed in order to avoid motion sickness. The movement is usually correctly captured by the display device (an HMD, for example). However, providing the correct pixels for display, regardless of the movement of the user (rotational or translational), is currently problematic. This requires multiple captured views and the ability to generate additional virtual (synthesised) views, calculated from the decoded captured views and the associated depth maps. The number of views to be transmitted varies depending on the use cases. However, the number of views to be transmitted is large and the amount of associated data is therefore often high. Consequently, the transmission of the views is an essential aspect of immersive video applications. It is therefore necessary to reduce the bit rate of the information to be transmitted as much as possible without compromising the quality of the synthesis of the intermediate views. Indeed, the synthesis of intermediate views is a crucial step in immersive video applications, so the overall transmission rate must be reduced while simultaneously making the view synthesis easier.

In a typical immersive video processing scheme, the views are physically captured or generated by computer. In some cases, the depths are also captured, with dedicated sensors. However, the quality of this depth information is generally poor and prevents an effective synthesis of the intermediate viewpoints.

Depth maps can also be calculated from the texture images of the captured videos. Many depth estimation algorithms exist and are used in the state of the art. The texture images and the estimated depth information are encoded and sent to a user's display device, as illustrated in FIG. 1. FIG. 1 shows an immersive video processing scheme comprising for example two captured views V0 and V2, and depth information D0 and D2 associated with each view V0 and V2. For example, the depth information D0 and D2 is obtained by a depth estimation software (Depth Estimation Reference Software, or DERS, for example), the views V0 and V2 and the depth information D0 and D2 obtained are then encoded, for example using an MV-HEVC encoder. On the client side, the views (V0* and V2*) and the depths of each view (D0* and D2*) are decoded and used by a synthesis algorithm to calculate intermediate views, for example here an intermediate view V1. For example, the VSRS (View Synthesis Reference Software) software can be used as a view synthesis algorithm.

When the depth maps are calculated prior to encoding and transmitting the encoded data of an immersive video, various problems are encountered. In particular, the rate associated with the transmission of the various views is high. Particularly, although depth maps are generally less expensive than texture, they remain a significant proportion of the bit stream (15% to 30% of the total).

In addition, complete depth maps are generated and sent, whereas on the client side, not all parts of all depth maps are necessarily useful. Indeed, the views can have redundant information, which makes some parts of depth maps unnecessary. In addition, in some cases, the viewers may request only specific viewpoints. Without a feedback channel between the client and the server providing the encoded immersive video, the depth estimator located on the server side is not aware of these specific viewpoints.

Calculating the depth information on the server side avoids any interaction between the depth estimator and the synthesis algorithm. For example, if a depth estimator wants to inform the synthesis algorithm that it cannot correctly find the depth of a specific area, it must transmit this information in the binary stream, most likely in the form of a binary map.

In addition, the configuration of the encoder to encode the depth maps in order to obtain the best compromise between synthesis quality and encoding cost for depth map transmission is not obvious.

Finally, the number of pixels to be processed by a decoder is high when the textures and the depth maps are encoded, transmitted and decoded. This can slow down the deployment of immersive video processing schemes on terminals such as smartphones.

There is therefore a need to improve the prior art.

3. SUMMARY OF THE INVENTION

The invention improves the prior art. For this purpose, it relates to a method for processing multi-view video data, said multi-view video data comprising at least one part of a reconstructed image of at least one view of the multi-view video, from an encoded data stream representative of the multi-view video, the processing method comprises:
  obtaining at least one item of data, from at least said one part of the reconstructed image, referred to as synthesis data,
  synthesising at least one image of an intermediate view of the multi-view video not encoded in said encoded data stream, from at least said one part of the reconstructed image and from said synthesis data obtained.

According to the invention, intermediate views of a multi-view video can be synthesised at the decoder or the display device without requiring the transmission of the data necessary to synthesise such views. For example, the intermediate views can be synthesised by a device located after the decoder in the playback chain of a multi-view video, or in a module comprised in the decoder itself, after the data stream decoding process.

Advantageously, the data necessary to synthesise intermediate views are obtained on the decoder side, from at least one part of decoded and reconstructed views that have been transmitted to the decoder. Such views can be views of the scene captured or not captured by the cameras.

Such data can be obtained at the decoder, or by a module independent of the decoder taking as input the views decoded and reconstructed by the decoder. Thus, the invention reduces the encoding rate of a multi-view video.

In addition, as the data used in the synthesis is no longer encoded, unlike in the prior art, it is no longer necessary to find an optimal encoding for this data. For example, in the case where the data used for the synthesis corresponds to depth maps, it is no longer necessary to find a compromise between the encoding cost of the textures of the multi-view video and the encoding cost of the associated depth maps.

The decoding of the multi-view video is also simplified, since the decoder no longer needs to decode the data used to synthesise intermediate views that, according to the prior art, were encoded in a data stream. In addition, the pixel rate to be processed by the decoder is thus reduced.

According to a particular embodiment of the invention, said synthesis data corresponds to at least one part of a depth map.

According to a particular embodiment of the invention, the data processing method further comprises decoding from the encoded data stream at least one item of data, referred to as decoded data, making it possible to modify the synthesis data obtained or to control the obtaining of the synthesis data.

According to another particular embodiment of the invention, the synthesis data is obtained using a neural network.

According to another particular embodiment of the invention, the decoded data of the encoded data stream corresponds to refinement data of the synthesis data and the method for processing multi-view video data further comprises modifying said synthesis data from the decoded refinement data.

This particular embodiment of the invention enhances the synthesis data obtained on the decoder side, and thus the quality of the synthesis of intermediate views, by modifying the synthesis data thanks to refinement data encoded in a data stream transmitted to the device implementing the data processing method by the decoder or the encoder. The refinement data can be encoded in the encoded data stream of the multi-view video, or in another encoded data stream.

Here, decoding the refinement data can only correspond to reading data encoded in the stream corresponding to the refinement data. Alternatively, decoding the refinement data can also comprise the entropy decoding of the encoded data to obtain the refinement data.

According to yet another variant, decoding the refinement data can also comprise other decoding steps to reconstruct the refinement data, for example, prediction of the refinement data, inverse transform, etc.

According to another particular embodiment of the invention, the synthesis data is modified by adding the refinement data to the synthesis data.

For example, on the encoder side, optimal synthesis data corresponding to synthesis data obtained from original (not encoded) images of the multi-view video can be used to calculate a difference between this optimal synthesis data and the synthesis data obtained from one part of the image reconstructed at the decoder. The refinement data then corresponds to such a difference. On the client side, the synthesis data is refined by adding the difference.

This particular embodiment of the invention enhances the quality of the images of the synthesised intermediate views. Indeed, the refined synthesis data is then closer to the synthesis data that would be obtained from the source images of views the multi-view video.

According to another particular embodiment of the invention, the data decoded from the data stream corresponds to a control parameter and the method for processing multi-view video data further comprises applying said control parameter when obtaining said synthesis data. This particular embodiment of the invention makes it possible to control the method for obtaining the synthesis data, for example by applying a filter to de-noise the synthesis data obtained or sharpen the edges of objects in the images. Such a control parameter can have been determined at the encoder via a rate/distortion optimisation process to optimise the quality of the synthesised images.

According to another particular embodiment of the invention, obtaining the synthesis data comprises:
  extracting said synthesis data from at least said one part of the reconstructed image,
  modifying said synthesis data obtained using a neural network.

This particular embodiment of the invention enhances the quality of the synthesis by refining the synthesis data obtained on the decoder side from the reconstructed textures of the multi-view video. According to this particular embodiment of the invention, the synthesis data obtained is modified using a neural network that has been previously trained on a set of learning videos.

According to another particular embodiment of the invention, the control parameter corresponds to an update parameter of said neural network used to modify said synthesis data.

This particular embodiment of the invention enhances the quality of the synthesis by refining the synthesis data obtained on the decoder side using an update of the neural network.

The invention also relates to a device for processing multi-view video data, said multi-view video data comprising at least one part of a reconstructed image of at least one view of the multi-view video, from an encoded data stream representative of the multi-view video, the processing device comprises a processor and a memory configured to:
  obtain at least one item of data from at least said one part of the reconstructed image, referred to as synthesis data, used to synthesise at least one intermediate view of the multi-view video,
  synthesise at least one image of an intermediate view of the multi-view video not encoded in said encoded data stream, from at least said one portion of the reconstructed image and from said synthesis data obtained.

According to a particular embodiment of the invention, such a device is comprised in a terminal.

The method for processing multi-view video data according to the invention can be implemented in various ways, notably in wired form or in software form. According to a particular embodiment of the invention, the method for processing multi-view video data is implemented by a computer program. The invention also relates to a computer program comprising instructions for implementing the method for processing multi-view video data according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means, such as a ROM, for example a CD-ROM or a microelectronic circuit ROM, a USB flash drive, or a magnetic recording means, for example a hard drive. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

4. LIST OF FIGURES

Other characteristics and advantages of the invention will emerge more clearly upon reading the following description of a particular embodiment, provided as a simple illustrative non-restrictive example, and the annexed drawings, wherein.

5. DESCRIPTION OF AN EMBODIMENT OF THE INVENTION 5.1 General Principle of the Invention The general principle of the invention is to allow synthesising intermediate views on the client side from at least one part of a reconstructed view without requiring the encoding and transmission of depth maps to the decoder.

Instead of explicitly transmitting the depth maps, i.e. encoding them in the data stream representing the multi-view video, the depth maps are estimated on the decoder side from the decoded textures of the multi-view video.

This general principle applies preferentially to depth maps, but it can be extended to all types of data that can be used in the synthesis of intermediate views. This data can be used in addition to or instead of the depth maps.

Examples of data that can be used in the synthesis of intermediate views include, but are not limited to:
  partial depth maps, i.e. images for which some pixels correspond to depth maps and others to a reserved value indicating that no depth map is available,
  contour maps or angles present in an image: the structural information contained in the contour maps, the angles and the active contours can be used by the view synthesis algorithm, for example to avoid ghosting artifacts. This can be achieved by enhancing the synthesis algorithm or by enhancing the depth maps. Contour detection approaches can comprise the use of Sobel, Canny, Prewitt or Roberts type operators. The angles can be estimated using a Harris type angle detection operator,
  features extracted by SIFT (Scale-Invariant Feature Transform) or SURF (Speeded-Up Robust Features) type algorithms. Such algorithms are used for the estimation of homographies, fundamental matrices and image matching. The features extracted by these methods therefore share features similar to those of the depth maps, implying a relationship between the images. The SURF algorithm is an extension of the SIFT algorithm, replacing the Gaussian filter in SIFT with a medium filter,
  statistical features calculated on one or more textures (local or on the complete image), histograms, etc.

Machine learning methods, such as convolutional neural networks (CNNs), can also be used to extract from the reconstructed textures features that are useful for view synthesis.

The data that can be used in the synthesis of intermediate views will be called hereafter synthesis data. Such an expression covers not only depth maps, but also the data mentioned above. Other types of data not listed here are also possible.

5.2 Particular Embodiments of the Invention

Figure 1:
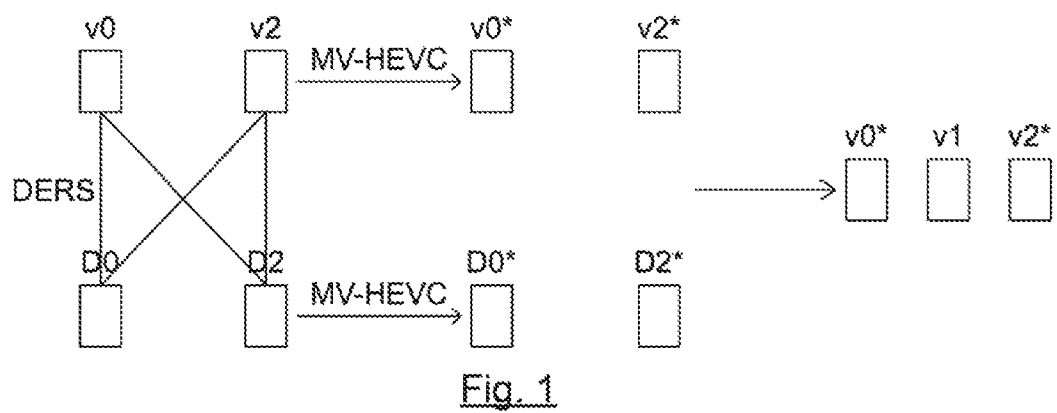
FIG. 1 illustrates a multi-view video data processing scheme according to the prior art.
Figure 2:
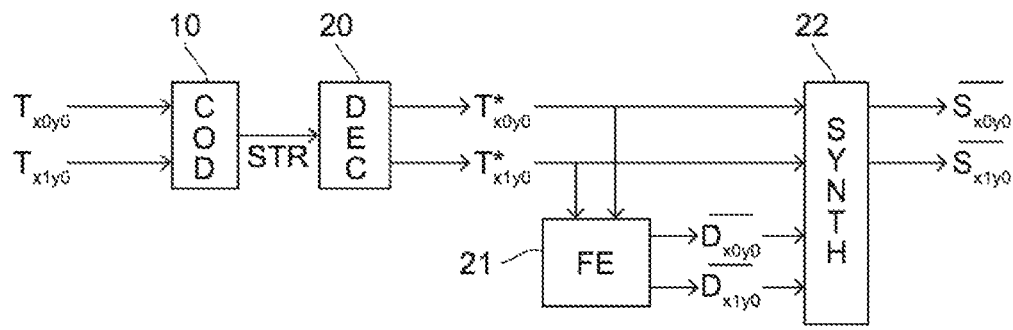
FIG. 2 illustrates steps of a method for processing multi-view video data according to a particular embodiment of the invention.

FIG. 2 illustrates steps of a method for processing multi-view video data according to a particular embodiment of the invention.

For example, a scene is captured by two converging cameras located outside the scene and looking at the scene from two different locations, with a different distance from the scene and different orientations or angles.

Each camera provides an uncompressed sequence of 2D images. Each sequence of 2D images comprises a succession of texture images $T_{x0y0}$ and $T_{x1y0}$ respectively.

In a step 10, these sequences of images are encoded using a video encoder COD, for example an MV-HEVC multi-view video encoder, that produces a binary data stream STR sent over the network.

On the client side, a viewer has a smartphone with free navigation decoding functions. The viewer looks at the scene from the viewpoint provided by the first camera. Then, for example, they slowly slide left towards the other camera. During this process, the smartphone displays intermediate views of the scene that have not been captured by the cameras. These intermediate views are synthesised by a synthesis module SYNTH from the texture data that has been reconstructed from the received data stream.

The particular embodiment described in relation to FIG. 2 is explained in relation to the above use case. The implementation of the particular embodiment described in relation to FIG. 2 is however not limited to this one use case.

In a step 20, the binary stream STR is decoded by a decoder DEC, for example here an MV-HEVC decoder. After decoding the binary stream STR, the smartphone obtains the decoded textures $T^*_{x0y0}$ and $T^*_{x1y0}$.

According to the invention, in a step 21, the depth maps $\overline{D_{x0y0}}$ and $\overline{D_{x1y0}}$ are extracted using the decoded textures $T^*_{x0y0}$ and $T^*_{x1y0}$ by a depth estimator FE, for example, here the DERS software (depth evaluation software).

In a step 22, the extracted depth maps $\overline{D_{x0y0}}$ and $\overline{D_{x1y0}}$ and the decoded textures $T^*_{x0y0}$ and $T^*_{x1y0}$ are transmitted to the input of the synthesis module SYNTH to perform the view synthesis of the intermediate viewpoint requested by the user at a given instant. For example, the synthesis module SYNTH can be a VSRS (View Synthesis Reference Software) synthesis module.

At the end of step 22, the synthesis module provides the images of synthesised views $\overline{S_{x0y0}}$ and $\overline{S_{x1y0}}$ corresponding to the requested viewpoint.

Figure 3A:
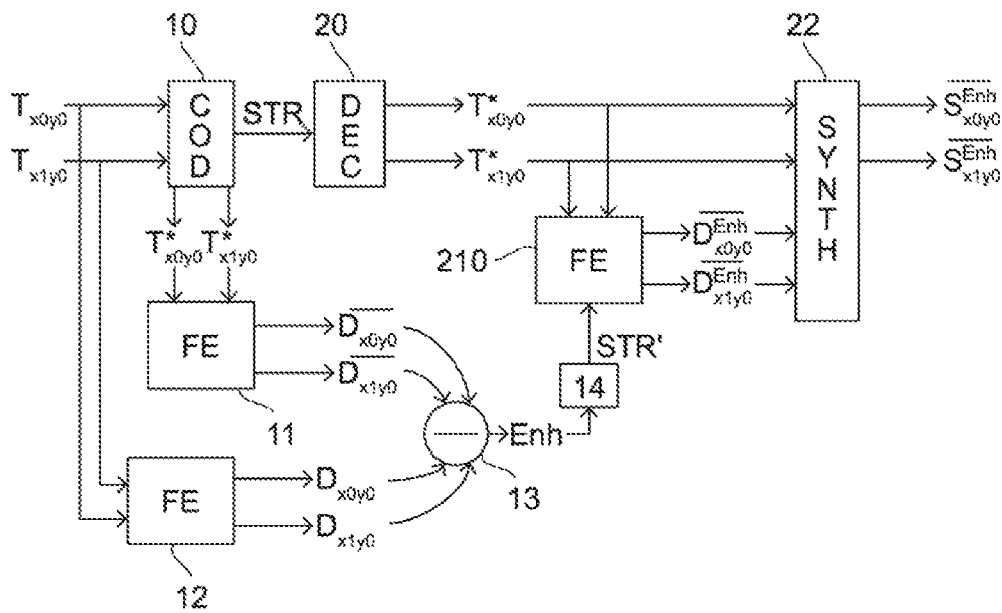
FIG. 3A illustrates steps of a method for processing multi-view video data according to another particular embodiment of the invention.

FIG. 3A illustrates steps of a method for processing multi-view video data according to another particular embodiment of the invention. According to this other particular embodiment of the invention, the depth maps extracted on the client side are refined using refinement data transmitted by the encoder.

For example, a scene is captured by two divergent cameras, located in the centre of the scene and looking outwards, in different directions, but with some overlap.

Each camera provides an uncompressed sequence of 2D images. Each sequence of 2D images comprises a succession of texture images $T_{x0y0}$ and $T_{x1y0}$ respectively.

In a step 10, these sequences of images are encoded using a video encoder COD, for example an MV-HEVC multi-view video encoder, that produces a binary data stream STR sent over the network.

In order to refine the synthesis data, here depth maps, extracted on the client side, the encoder calculates refinement information from the depth maps estimated from decoded textures and the depth maps estimated from source textures.

For this purpose, in a step 11, the depth maps $\overline{D_{x0y0}}$ and $\overline{D_{x1y0}}$ are extracted by the depth estimator FE using the decoded textures $T^*_{x0y0}$ and $T^*_{x1y0}$ provided by the encoder COD.

In a step 12, the depth maps $D_{x0y0}$ and $D_{x1y0}$ are extracted by the depth estimator FE using the source textures $T_{x0y0}$ and $T_{x1y0}$.

In a step 13, the refinement data Enh is obtained as follows, by calculating the difference between the depth maps $\overline{D_{x0y0}}$ and $\overline{D_{x1y0}}$ estimated from the textures decoded in 20 and the depth maps $D_{x0y0}$ and $D_{x1y0}$ estimated in 12, from the source textures:

$$Enh = \begin{pmatrix} Enh0 \\ Enh1 \end{pmatrix} = \begin{pmatrix} \overline{D_{x0y0}} - D_{x0y0} \\ \overline{D_{x1y0}} - D_{x1y0} \end{pmatrix}.$$

In the case of depth maps, for each view considered, here x0y0 and x1y0, such a difference Enh0 and Enh1 is calculated pixel by pixel and represented as an image (depth map).

In a step 14, the refinement data obtained Enh is encoded and transmitted in a binary stream STR'. This binary stream STR' can be inserted into the binary stream STR originating from the texture encoding or transmitted independently.

On the client side, for example, a viewer has an HMD headset with free navigation decoding functions. The viewer looks at the scene from the viewpoint provided by the first camera, under a certain angle. Then, they slowly move forward and turn their head. During this process, the HMD headset displays intermediate views of the scene that have not been captured by the cameras.

Figure 3B:
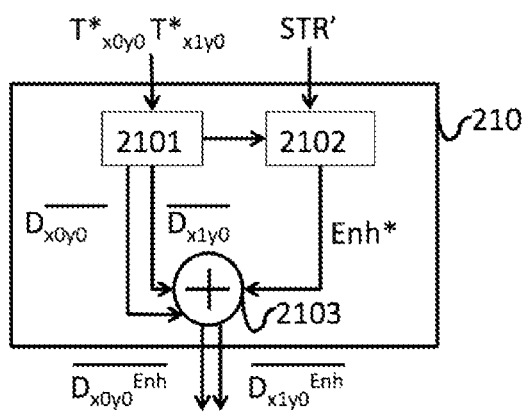
FIG. 3B illustrates sub-steps of a step for obtaining depth maps according to a particular embodiment of the invention.

The particular embodiment described in relation to FIGS. 3A and 3B is explained in relation to the above use case. The implementation of this particular embodiment is however not limited to this one use case.

In step 20, the binary stream STR is decoded by a decoder DEC, for example here an MV-HEVC decoder. After decoding the binary stream STR, the HMD headset obtains the decoded textures $T^*_{x0y0}$ and $T^*_{x1y0}$.

According to the invention, in a step 210, the HMD headset obtains the refined depth maps from the decoded textures $T^*_{x0y0}$ and $T^*_{x1y0}$ and the refinement data Enh.

FIG. 3B illustrates sub-steps of step 210 for obtaining depth maps according to this particular embodiment of the invention.

According to a step 2101, the depth maps $\overline{D_{x0y0}}$ and $\overline{D_{x1y0}}$ are extracted using the decoded textures $T^*_{x0y0}$ and $T^*_{x1y0}$ by the depth estimator FE, for example, here the DERS software (depth evaluation software).

In a step 2102, the HMD headset receives and decodes the refinement data Enh from the data stream STR' and obtains the decoded refinement data Enh*.

In a step 2103, the decoded refinement data Enh* is added to the estimated depth maps $\overline{D_{x0y0}}$ and $\overline{D_{x1y0}}$, providing enhanced depth maps $\overline{D_{x0y0}}^{Enh}$ and $\overline{D_{x1y0}}^{Enh}$ The enhanced depth maps are for example calculated by:

$$\begin{pmatrix} \overline{D_{x0y0}}^{Enh} \\ \overline{D_{x1y0}}^{Enh} \end{pmatrix} = \begin{pmatrix} \overline{D_{x0y0}} + Enh0 \\ \overline{D_{x1y0}} + Enh1 \end{pmatrix}.$$

Then, in a step 22 (FIG. 3A), the enhanced depth maps $\overline{D_{x0y0}}^{Enh}$ and $\overline{D_{x1y0}}^{Enh}$ and the decoded textures $T^*_{x0y0}$ and $T^*_{x1y0}$ are transmitted to the input of the synthesis module SYNTH to perform the view synthesis of the intermediate viewpoint requested by the user at a given instant. For example, the synthesis module SYNTH can be a VSRS (View Synthesis Reference Software) synthesis module.

At the end of step 22, the synthesis module provides the images of synthesised views $\overline{S_{x0y0}}^{Enh}$ and $\overline{S_{x1y0}}^{Enh}$ corresponding to the requested viewpoint.

Figure 4A:
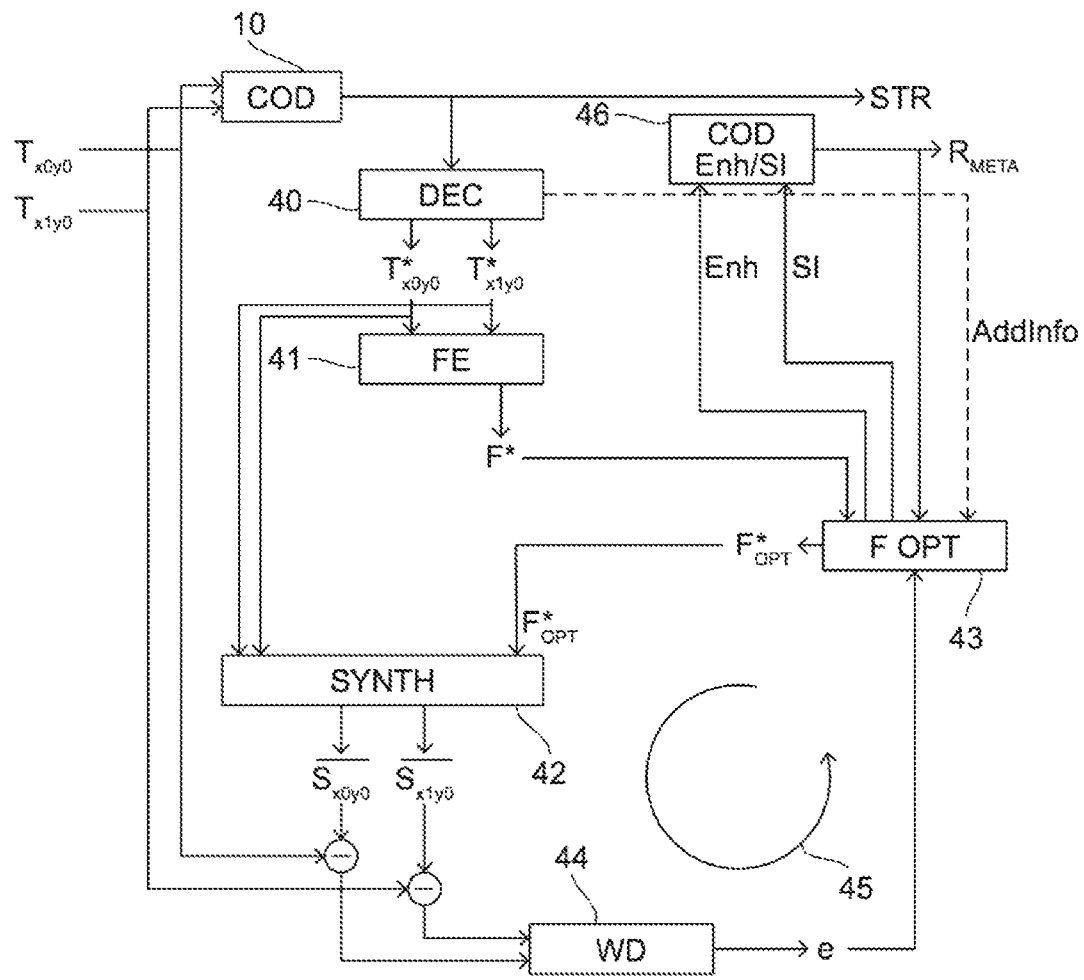
FIG. 4A illustrates steps of a multi-view video encoding method according to a particular embodiment of the invention.
Figure 4B:
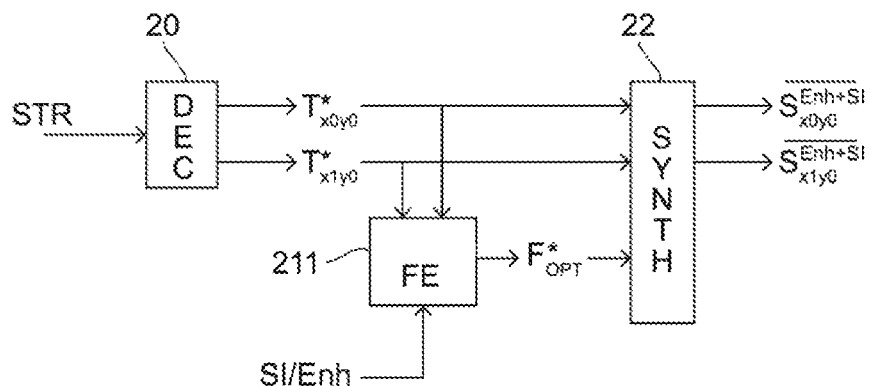
FIG. 4B illustrates steps of a method for processing multi-view video data according to another particular embodiment of the invention.

FIGS. 4A and 4B illustrate respectively steps of a multi-view video encoding method according to a particular embodiment of the invention and steps of a corresponding method for processing multi-view video data.

According to this particular embodiment of the invention, the depth maps can be refined by refinement data or the obtaining of the depth maps can be optimised using additional information transmitted by the encoder.

For example, a virtual video sequence is created using a rendering model of the software Blender. Blender is a set of open source 3D computer graphics software that can be used to create animated movies. According to the example described here, two converging virtual cameras are placed in the rendering model at two different locations. They therefore have a different distance from the virtual scene, and different orientations/angles to the scene.

Each virtual camera provides an uncompressed sequence of 2D CGI (Computer Generated Images) images. Each sequence of 2D CGI images comprises a succession of texture images $T_{x0y0}$ and $T_{x1y0}$ respectively.

In a step 10, these sequences of images are encoded using a video encoder COD, for example an MV-HEVC multi-view video encoder, that produces a binary data stream STR sent over the network.

The additional information is obtained on the server side, i.e. at the encoder, using an optimisation process. Such a process tests, for example, the following three synthesis data enhancement tools:
- a Gaussian smoothing filter, that removes the noise in the depth maps. The filter can be controlled by two parameters: a kernel size k and a standard deviation σ. The kernel size k can take the following values: 3, 5, 7, 9, and the standard deviation σ can be 0.5, 1, 2, or 4;
- a bilateral filter that removes the noise and enhances the edges. This filter can be controlled by three parameters: the size d of the neighbourhood of each pixel, the standard deviation in the colour space $\sigma_{color}$ and the standard deviation in the coordinate space $\sigma_{space}$. The size d can take the values 3, 5, 7, 9, the standard deviation $\sigma_{color}$ is derived from d by: $\sigma_{color}=d\times 2$ and the standard deviation $\sigma_{space}$ is derived from d by: $\sigma_{space}=d/2$;
- a morphological operation such as a closure (an expansion followed by an erosion) or an opening (an erosion followed by an expansion). These operations are used to close up the holes and remove the outliers from the depth maps. These operations are controlled by a kernel size k' and a number N of successive applications of the morphological operation. k' can take the values 3, 5, 7 or 9, and N is an integer comprised between 1 and 4.

In addition to the tools applied to the depth maps listed above, the additional information may comprise:
- control parameters necessary for the extraction of the contour maps, including a lower threshold and an upper threshold for contour detection,
- thresholding control parameters: whether the detected edges should be discarded or not.

The contour maps can be used in the feature optimisation process in order to prevent the smoothing of the contours, that must remain sharp.

Classically, the encoder comprises a decoding module DEC that, in a step 40, decodes and reconstructs the texture images $T^*_{x0y0}$ and $T^*_{x1y0}$.

In a step 41, the synthesis data F* is extracted from the reconstructed texture images $T^*_{x0y0}$ and $T^*_{x1y0}$ by a synthesis data extraction module FE. For example, the synthesis data can be depth maps and the extraction module a depth estimator.

In a step 43, each enhancement tool mentioned above and each possible combination of parameters for a tool is tested at the encoder, for example by an exhaustive search, using a synthesis data optimisation module FOPT.

Additional information (AddInfo), such as the partitioning of the encoded blocks in the image, the block displacement/movement information, can be transmitted by the decoder DEC to the optimisation module FOPT to assist in the application of an enhancement tool.

The goal of the synthesis data optimisation process is to minimize the distortion between the synthesised textures and the uncompressed source textures and to minimize the rate required to transmit the additional information.

According to this particular embodiment of the invention, the optimisation module FOPT also tests the encoding of refinement data Enh that is obtained by calculating a difference between the synthesis data optimised $F^*_{OPT}$ by a tool provided by the optimisation module FOPT and the synthesis data F* extracted from the reconstructed texture images $T^*_{x0y0}$ and $T^*_{x1y0}$.

The optimisation module FOPT therefore comprises a module for calculating the refinement data Enh (not shown).

The optimisation module FOPT tests each tool and each associated combination of parameters of the tool. Each tested tool produces a certain distortion e and a certain rate $R_{META}$, the rate $R_{META}$ corresponding to the rate required to transmit the additional information SI, i.e. the selected tool and the corresponding parameters of this tool.

During the rate/distortion optimisation, for each tested tool and its combination of parameters, the optimisation module FOPT tests whether a better rate/distortion compromise is obtained by encoding the tested tool and its combination of parameters or refinement data Enh obtained by calculating the difference between the synthesis data optimised $F^*_{OPT}$ by the tested tool and the synthesis data F* extracted from the reconstructed texture images $T^*_{x0y0}$ and $T^*_{x1y0}$.

When the rate/distortion compromise is better for encoding the refinement data Enh, the rate $R_{META}$ corresponds to the rate required to transmit this refinement data Enh.

For each tool and combination of parameters associated with a tool, the quality of the synthesis is checked (step 45) and a tool and its associated parameters are selected in the sense of a rate/distortion criterion.

For this purpose, for each tool and combination of parameters associated with a tool, the synthesis data optimisation module FOPT delivers optimised synthesis data $F_{opt}^*$. This optimised synthesis data $F_{opt}^*$ is obtained by applying to the extracted synthesis data F* the tested tool and combination of parameters. This is the synthesis data $F^*_{OPT}$ that will be obtained on the client side, either from the additional information SI or from the refinement data Enh.

In a step 42, a synthesis module SYNTH performs the synthesis of views $\overline{S_{x0y0}}$ and $\overline{S_{x1y0}}$ from the reconstructed textures $T^*_{x0y0}$ and $T^*_{x1y0}$ and the optimised synthesis data $F_{opt}^*$. In a step 44, the distortion e between the uncompressed textures and the synthesised views $\overline{S_{x0y0}}$ and $\overline{S_{x1y0}}$ is calculated.

In a step 46, the tool tested by the optimisation module FOPT and its parameters are encoded as additional information SI to provide the associated rate $R_{META}$.

The distortion e and the rate $R_{META}$ associated with the tested tool are provided to the optimisation module FOPT in order to perform the rate/distortion optimisation and select the tool and its parameters that provide $F_{opt}^*$ such as $F^*_{OPT}=\mathrm{argmin}(R_{META}+\lambda \times e)$., where $\lambda$ represents a Lagrangian parameter for the rate/distortion optimisation.

As described above, the optimisation module FOPT also tests whether for the tested tool, transmitting refinement data Enh is cheaper in terms of rate than encoding the tested tool and its parameters.

In the case where the best rate/distortion compromise corresponds to the transmission of refinement data Enh, no additional information SI is transmitted. The refinement data Enh is transmitted in the binary stream STR or another binary stream.

Otherwise, if the best rate/distortion comprise corresponds to the transmission of the selected tool and its parameters, this information is encoded in the additional information SI, and no refinement data Enh is transmitted. The additional information (SI) is transmitted in the binary stream STR or another binary stream. The additional information (SI) is considered as a control parameter to control the obtaining of the synthesis data on the client side in the sense of the invention.

On the client side, a viewer has a connected TV, also known as a Smart TV, with free navigation decoding functions. The viewer looks at the scene from the viewpoint provided by the first virtual camera. Then, they slowly move towards the other virtual camera. During this process, the connected TV displays intermediate views of the scene that have not been captured by the cameras.

FIG. 4B illustrates the decoding method according to the particular embodiment described in relation to FIG. 4A. According to this example, the same synthesis data optimisation tools are available on the client side.

In step 20, the binary stream STR is decoded by the decoder DEC, for example here an MV-HEVC decoder. After decoding the binary stream STR, the decoded textures $T^*_{x0y0}$ and $T^*_{x1y0}$ are obtained.

According to the invention, in a step 211, the optimised synthesis data $F^*_{OPT}$ is obtained from the decoded textures $T^*_{x0y0}$ and $T^*_{x1y0}$ and is refined by the refinement data Enh or optimised by the additional information SI depending on what has been transmitted to the decoder.

For this purpose, in step E211, as at the encoder, the synthesis data $F^*$ is extracted from the decoded textures $T^*_{x0y0}$ and $T^*_{x1y0}$.

If additional information SI indicating a tool to be applied to the synthesis data and the parameters corresponding to that tool have been transmitted, the synthesis data $F^*$ is optimised by applying that tool and its parameters indicated in the additional information SI to provide the optimised synthesis data $F^*_{OPT}$.

If refinement data Enh is transmitted to the decoder, the synthesis data $F^*$ is refined by adding the decoded refinement data Enh to the synthesis data $F^*$ to provide the optimised synthesis data $F^*_{OPT}$.

Then, in step 22, the optimised synthesis data $F^*_{OPT}$ and the decoded textures $T^*_{x0y0}$ and $T^*_{x1y0}$ are transmitted to the input of the synthesis module SYNTH to perform the view synthesis of an intermediate viewpoint requested by the user at a given instant.

At the end of step 22, the synthesis module provides the images of synthesised views $\overline{S_{x0y0}}^{Enh/SI}$ and $\overline{S_{x1y0}}^{Enh/SI}$ corresponding to the requested viewpoint.

The particular embodiment described in relation to FIGS. 4A and 4B is explained in relation to a particular use case described above. The implementation of the particular embodiment described in relation to FIGS. 4A and 4B is however not limited to this one use case.

Figure 5:
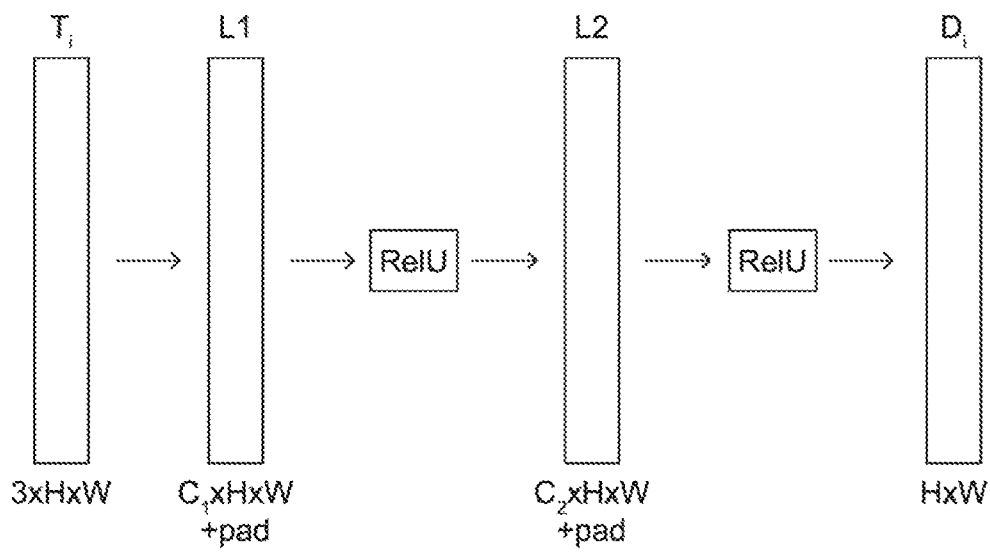
FIG. 5 illustrates an example of a neural network used for the extraction of synthesis data in the method for processing multi-view video data according to a particular embodiment of the invention.

FIG. 5 illustrates an example of a neural network used for the extraction of synthesis data in the method for processing multi-view video data according to a particular embodiment of the invention.

According to the particular embodiment of the invention described here, the synthesis data $D_i$ is extracted from the decoded textures $T_i$ by a convolutional neural network (CNN). The synthesis data using such a neural network is high-level data corresponding to the output of the neural network. The neural network can be integrated in the synthesis data extraction module FE of any one of the particular embodiments of the invention previously described.

FIG. 5 illustrates the structure of such a neural network. The neural network takes as input a texture image $T_i$ on three colour components, for example RVB, each component having a size H×W, where H corresponds to the number of pixel rows in the component and W corresponds to the number of pixel columns in the component. The output of the network corresponds to the synthesis data $D_i$, for example a depth map associated with the texture image provided as input, the depth map having a size H×W.

The structure of the neural network comprises two filter layers L1 and L2 as well as linear rectification steps (Rel U) after each filter layer L1, L2. Each filter layer L1 and L2 applies respectively to data of size C1×H×W and C2×H×W, where C1 and C2 correspond respectively to the number of convolution kernels applied to each layer. In order to keep the same resolution, a padding (named pad in FIG. 5) is applied before each convolutional layer of the neural network.

In order to calculate an error for the backpropagation, a ground truth of depth is used. For this purpose, a learning operation of the neural network is performed using a KITTI dataset (actual textures and depths) on the server side. The final neural network is then deployed to the client terminals that will be in charge of the decoding, by a smartphone of the client.

For the learning operation, the optimisation algorithm Adam (an extension of the stochastic gradient descent) is used with hyper-parameters configured so that the learning speed a is equal to 0.001 and the moments $\beta_1$ and $\beta_2$ are: $\beta_1=0,99$ and $\beta_2=0,99$.

Figure 6:
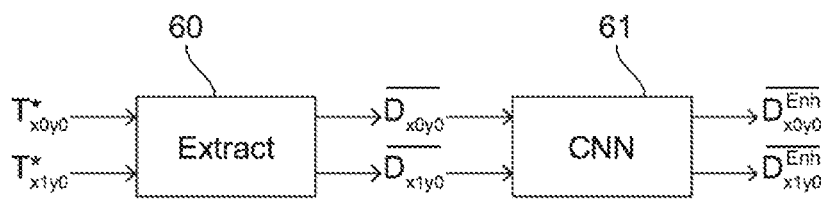
FIG. 6 illustrates steps of a method for processing multi-view video data according to another particular embodiment of the invention.

FIG. 6 illustrates steps of a method for processing multi-view video data according to another particular embodiment of the invention.

According to this particular embodiment of the invention, the extracted synthesis data is optimised using a neural network. This particular embodiment of the invention can apply to the synthesis data extraction module FE previously described according to any one of the particular embodiments of the invention.

For example, according to an embodiment, a scene is captured by a Lightfield camera, located outside the scene and looking at the scene. It is considered here that only two views, i.e. two uncompressed 2D sequences, are kept. Each sequence comprises a succession of texture images $T_{x0y0}$ and $T_{x1y0}$.

As in the embodiments previously described, these two sequences are encoded, for example by a multi-view codec, that generates a bit stream sent over the network.

On the client side, for example, a viewer has a Lightfield display device with free navigation decoding functions. The viewer looks at the scene from the viewpoint represented by the right plenoptic image. Then, for example, they slowly change their viewing position to the left towards the other plenoptic image. During this process, the Lightfield display device displays intermediate views of the scene that have been ignored on the server side or that have not been captured by the Lightfield camera.

The encoding, respectively decoding process, is similar to the one described in relation to FIG. 2, and only the synthesis data extraction steps are modified.

Once the optimised synthesis data is obtained, it is provided to the input of the synthesis module, for example here a Lightfield rendering device, that performs the synthesis of a viewpoint requested by the user at a given instant. The output of such a synthesis module comprises for example the views $\overline{S_{x0y0}}$, $\overline{S_{x1y0}}$ and $\overline{S_{x0.5y0}}$. As the user changes their viewing position slightly more to the left, intermediate views between the viewpoints x=0.5 and x=1 must be synthesised. The depth maps are then estimated again by the extraction module FE, this time using the previously synthesised view $\overline{S_{x0.5y0}}$ instead of the decoded texture $T_{x0y0}*$.

The depth map $D_{x0.5y0}$ obtained is then used to synthesise the intermediate viewpoints requested between x=0.5 and x=1.

According to the particular embodiment of the invention described here, as in the example described in relation to FIG. 2, in a step 60, the depth maps $\overline{D_{x0y0}}$ and $\overline{D_{x1y0}}$ are extracted from the decoded textures $T_{x0y0}*$ and $T_{x1y0}*$ by a depth estimator (Extract).

In a step 61, the depth maps $\overline{D_{x0y0}}$ and $\overline{D_{x1y0}}$ are optimised using a neural network (CNN) to provide enhanced depth maps $D_{x0y0}^{Enh}$ and $D_{x1y0}^{Enh}$.

The particular embodiment described in relation to FIG. 6 is explained in relation to a particular use case described above. The implementation of the particular embodiment described in relation to FIG. 6 is however not limited to this one use case.

Figure 7:
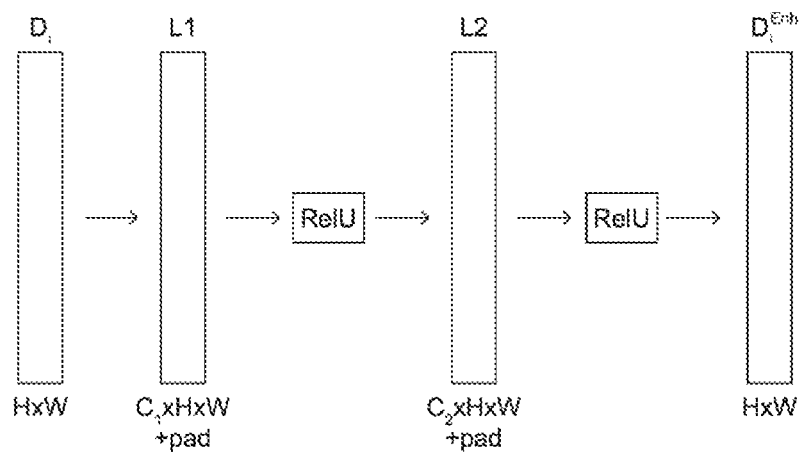
FIG. 7 illustrates an example of a neural network used for refining synthesis data in the method for processing multi-view video data according to a particular embodiment of the invention.

FIG. 7 illustrates the structure of such a neural network. The neural network takes as input a depth map $D_i$ of size H×W, where H corresponds to the number of pixel rows and W corresponds to the number of pixel columns in the depth map, and the output of the network is an enhanced depth map $D_i^{Enh}$, also of size H×W. The structure of the neural network comprises two filter layers L1 and L2 as well as linear rectification steps (Rel U) after each filter layer L1, L2. Each filter layer L1 and L2 applies respectively to data of size C1×H×W and C2×H×W, where C1 and C2 correspond respectively to the number of convolution kernels applied to each layer. In order to keep the same resolution, a padding (named pad in FIG. 7) is applied before each convolutional layer of the neural network.

In order to calculate an error for the backpropagation, a ground truth of depth is used. For this purpose, a learning operation of the neural network is performed using a KITTI dataset (actual textures and depths) on the server side. For the learning operation, the Adam optimisation algorithm is used with the following parameters: α=0,001, $β_1$=0,99 and $β_2$=0,99.

Another particular embodiment of the invention is presented below in relation to FIG. 8 and FIG. 9. According to this particular embodiment of the invention, the synthesis data extracted from the reconstructed textures is enhanced using additional information.

An example of a use case of such a particular embodiment of the invention is described below.

Figure 8:
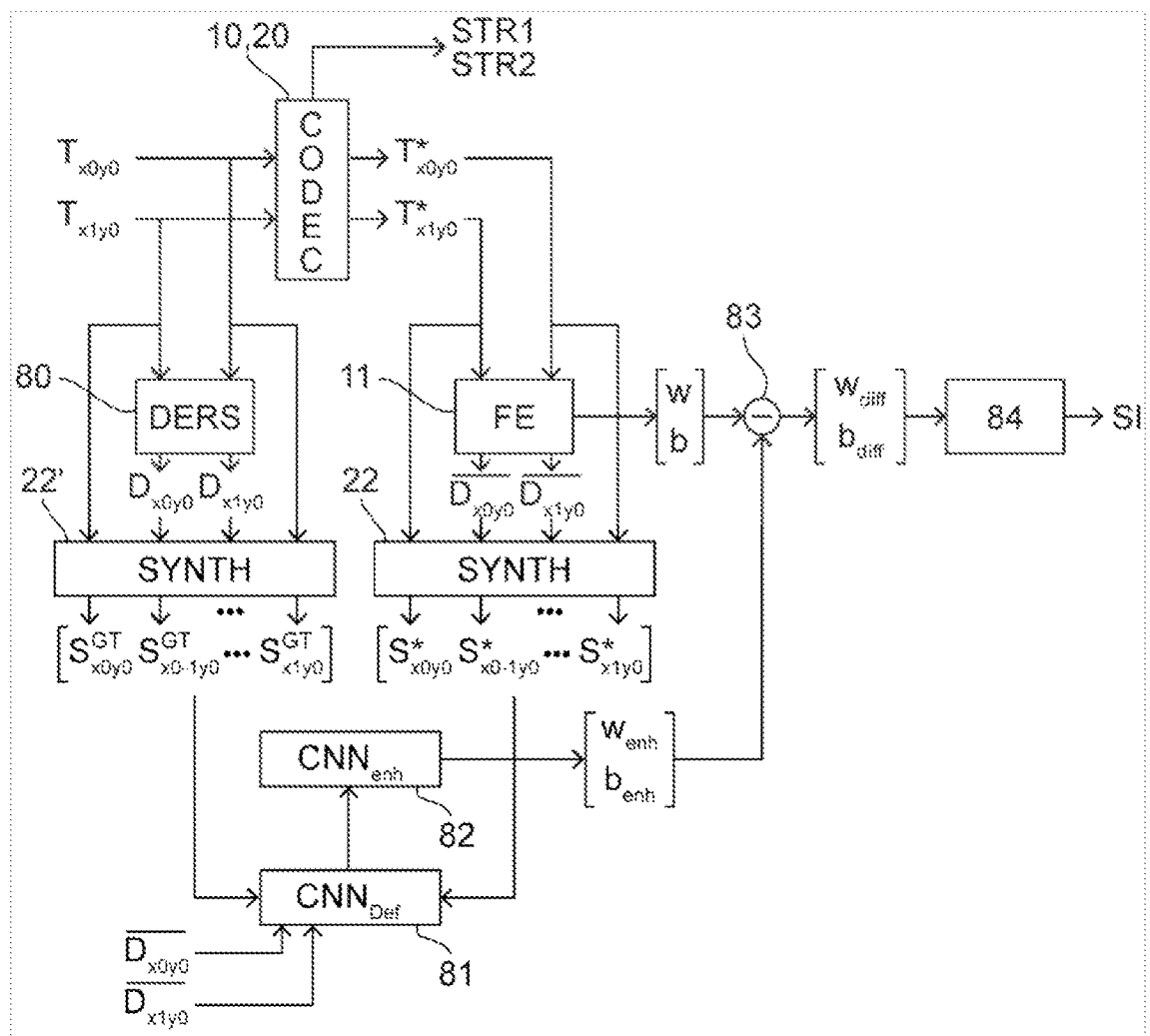
FIG. 8 illustrates steps of a multi-view video encoding method according to another particular embodiment of the invention.
Figure 9:
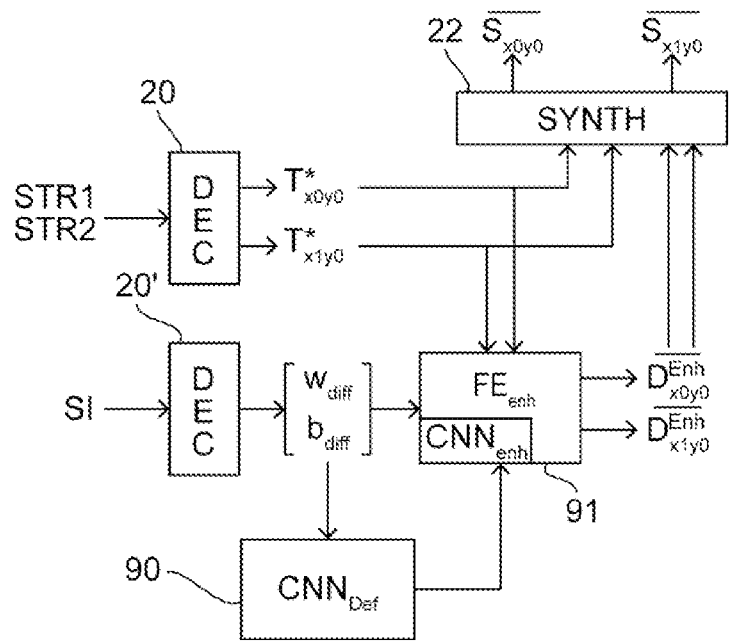
FIG. 9 illustrates steps of a method for processing multi-view video data according to another particular embodiment of the invention.

The implementation described later in relation to FIGS. 8 and 9 is however not limited to this one use case.

A scene is captured by two diverging cameras located inside the scene and looking at the scene from two different locations, with a different distance from the scene and different orientations or angles.

Each camera provides an uncompressed sequence of 2D images. Each sequence of 2D images comprises a succession of texture images $T_{x0y0}$ and $T_{x1y0}$ respectively.

These sequences of images $T_{x0y0}$ and $T_{x1y0}$ are encoded using a video encoder, for example an MV-HEVC multi-view video encoder, that produces a binary data stream STR sent over the network.

On the client side, for example, a viewer has an HMD headset connected to a computer, with free navigation decoding functions. The viewer can look at the scene from the viewpoint provided by the first camera. Then, they slowly change their viewing position towards the other camera. During this process, the computer calculates intermediate views of the scene that have not been captured by the cameras and displays them via the HMD headset.

FIG. 8 illustrates steps of a multi-view video encoding method according to the particular embodiment of the invention described here.

Classically, in steps 10, 20, the sequences of images $T_{x0y0}$ and $T_{x1y0}$ are encoded separately and reconstructed using a video encoder-decoder CODEC, for example, an HEVC video encoder, that produces two binary data streams STR1, STR2 sent over the network and providing at output the reconstructed textures $T_{x0y0}*$ and $T_{x1y0}*$.

In order to refine the synthesis data, here depth maps, extracted on the client side, the encoder calculates additional information that enhance the synthesis data extracted at the decoder.

According to the particular embodiment described here, the additional information is obtained by a learning operation of a neural network performed from synthesised views of the scene.

For this purpose, in a step 11, the depth maps $\overline{D_{x0y0}}$ and $\overline{D_{x1y0}}$ are extracted by the depth estimator FE using the decoded textures $T*_{x0y0}$ and $T*_{x1y0}$ provided by the encoder. After their extraction, these depth maps are enhanced using a pre-trained neural network $CNN_{Def}$ integrated in the module FE.

The neural network $CNN_{Def}$ has previously been trained on a set of test sequences. An example of the structure of such a neural network is described in relation to FIG. 7. The neural network comprises two filter and update layers. To keep the same data size, a padding is used. The neural network takes as input a depth map and provides at output an enhanced depth map. The initial learning operation of the neural network is performed off-line using the KITTI sequence set. For the learning operation, the gradient descent optimisation algorithm is used with the learning speed a equal to 0.0005. The pre-trained neural network $CNN_{Def}$ can then be deployed to the client terminals that will be in charge of the decoding, for example, a smartphone of the client.

In order to enhance the quality of synthesis on the client side, in a step 81, the neural network $CNN_{Def}$ is re-trained using the source textures of the scene $T_{x0y0}$ and $T_{x1y0}$. These textures are not part of the initial KITTI learning set used to train the neural network and therefore allow the neural network to be updated using the data of the multi-view sequence to be transmitted to the client.

For this purpose, in a step 80, depth maps $D_{x0y0}$ and $D_{x1y0}$ are extracted by a depth estimator DERS using the source textures $T_{x0y0}$ and $T_{x1y0}$.

In step 22, the depth maps $\overline{D_{x0y0}}$ and $\overline{D_{x1y0}}$ extracted from the reconstructed textures and the decoded textures $T*_{x0y0}$ and $T^*_{x1y0}$ are transmitted to the input of a synthesis module SYNTH to perform the synthesis of views of the scene.

At the end of step 22, the synthesis module provides a set of synthesised views $[S_{x0y0}, S^*_{x0.1y0}, \ldots, S^*_{x1y0}]$.

In step 22', the depth maps $\overline{D_{x0y0}}$ and $\overline{D_{x1y0}}$ extracted from the source textures and the source textures $T_{x0y0}$ and $T_{x1y0}$ are transmitted to the input of the synthesis module SYNTH to perform the synthesis of views of the scene. At the end of step 22', the synthesis module SYNTH provides a set of synthesised views $[S_{x0y0}^{GT}, S_{x0.1y0}^{GT}, \ldots, S_{x1y0}^{GT}]$.

To calculate a backpropagation error during the learning operation of the neural network $CNN_{Def}$, the calculated error is a distance L2 between the synthesised views $[S^*_{x0y0}, S^*_{x1y0}, \ldots, S^*_{x1y0}]$ obtained from the estimated depth maps $\overline{D_{x0y0}}$ and $\overline{D_{x1y0}}$ and the actual synthesised views $[S_{x0y0}^{GT}, S_{x0.1y0}^{GT}, \ldots, S_{x1y0}^{GT}]$ obtained from the depth maps $D_{x0y0}$ and $D_{x1y0}$ extracted from the source textures.

In step 81, the weights of the neural network $CNN_{Def}$ are adjusted to provide an enhanced neural network $CNN_{Enh}$. Thanks to this re-learning operation, the performance of the neural network $CNN_{Def}$ is enhanced.

In a step 82, the parameters $$\begin{bmatrix} w_{enh} \\ b_{enh} \end{bmatrix}$$

for updating the enhanced neural network $CNN_{Enh}$ are determined, where $w_{enh}$ represents the weights of the neural network and $b_{enh}$ the bias.

In a step 83, the additional information is determined as the difference $$\begin{bmatrix} w_{diff} \\ b_{diff} \end{bmatrix}$$

between the parameters $$\begin{bmatrix} w_{enh} \\ b_{enh} \end{bmatrix}$$

of the enhanced neural network $CNN_{enh}$ and the parameters $$\begin{bmatrix} w \\ b \end{bmatrix}$$

of the initial neural network $CNN_{Def}$, with $w_{diff}=w_{enh}-w$ and $b_{diff}=b_{enh}-b$.

In a step 84, the additional information is encoded in the binary data stream STR or another data stream SI. Such additional information corresponds to a control parameter to be applied when obtaining the synthesis data in the sense of the invention.

FIG. 9 illustrates steps of a method for processing multi-view video data according to the particular embodiment of the invention described in relation to FIG. 8.

In step 20, the binary streams STR1 and STR2, corresponding respectively to the two views encoded by the encoding method described in relation to FIG. 8, are decoded by one or more decoders DEC, for example here an HEVC decoder. After decoding the binary streams STR1 and STR2, the decoded textures $T^*_{x0y0}$ and $T^*_{x1y0}$ are obtained.

In a step 20', the binary stream SI comprising the additional information is decoded, for example by the decoder DEC, to provide the adjustment rules $$\begin{bmatrix} w_{diff} \\ b_{diff} \end{bmatrix}$$

of the pre-trained neural network $CNN_{Def}$.

In a step 90, the pre-trained neural network $CNN_{Def}$ is updated using the adjustment rules $$\begin{bmatrix} w_{diff} \\ b_{diff} \end{bmatrix}$$

to provide the enhanced neural network $CNN_{Enh}$.

In a step 91, the depth maps $\overline{D_{x0y0}^{Enh}}$ and $\overline{D_{x1y0}^{Enh}}$ are extracted by the depth estimator $FE_{enh}$ using the decoded textures $T^*_{x0y0}$ and $T^*_{x1y0}$. After their extraction, these depth maps are enhanced using the enhanced neural network $CNN_{Enh}$.

In step 22, the depth maps $\overline{D_{x0y0}^{Enh}}$ and $\overline{D_{x1y0}^{Enh}}$ obtained in step 91 are transmitted to the input of a synthesis module SYNTH with the reconstructed textures $T^*_{x0y0}$ and $T^*_{x1y0}$ to perform the synthesis of views of the scene requested by the user.

At the end of step 22, the synthesis module provides for example the synthesised views $\overline{S_{x0y0}}$ and $\overline{S_{x1y0}}$.

Figure 10:
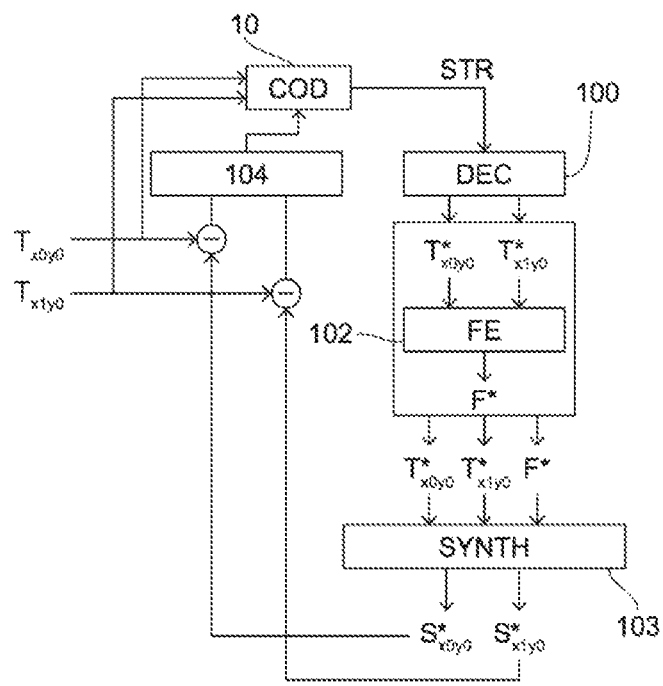
FIG. 10 illustrates steps of a multi-view video encoding method according to another particular embodiment of the invention.

FIG. 10 illustrates steps of a multi-view video encoding method according to another particular embodiment of the invention. According to this particular embodiment of the invention, the multi-view encoder is enhanced by taking into account the rate/distortion optimisation performed by this encoder of the quality of the view synthesis obtained from the synthesis data extracted from the decoded textures. In other words, the texture encoding is optimised to optimise the quality of the synthesised views on the client side. Classically, distortion/rate decisions are based on the distortion of each component of a view (texture/depth) compared to the uncompressed version of that component. In the 3D-HEVC encoder, the compression of the depth maps depends on the quality of the synthesis. Since the quality of the texture is important for the quality of the synthesis, according to the particular embodiment of the invention described here, a joint distortion of the synthesised views is calculated and used for the rate/distortion optimisation in the texture encoding process.

For this purpose, in a step 10, the sequences of image $T_{x0y0}$ and $T_{x1y0}$ captured by the cameras are encoded using a video encoder COD, for example an MV-HEVC multi-view video encoder.

In a step 100, a decoder DEC comprised in the encoder COD reconstructs the encoded textures, providing decoded textures $T^*_{x0y0}$ and $T^*_{x1y0}$.

In a step 102, synthesis data F* is extracted from the reconstructed textures by a depth estimator FE. This synthesis data is, for example, depth maps.

In a step 103, the synthesis data F* and the decoded textures $T^*_{x0y0}$ and $T^*_{x1y0}$ are transmitted to the input of the synthesis module SYNTH to perform the view synthesis. At the end of step 103, the synthesis module provides the images of synthesised views $S^*_{x_0y_0}$ and $S^*_{x_1y_0}$.

A difference is then calculated between the images of a source view and the images of a synthesised view corresponding to the same viewpoint. In the example described here, only two distinct viewpoints x0y0 and x1y0 are considered, but other viewpoints can also be considered.

The quality of the synthesis is evaluated from the MSE (Mean Square Error) calculated between a synthesised view and a corresponding source texture.

For this purpose, in a step 104, the joint distortion of the synthesised views is calculated. Joint distortion is understood here as a weighted sum of distortions comprising the distortion of a decoded view with respect to its corresponding source view, and the distortion of the synthesised views with respect to their corresponding source views, i.e. corresponding to the same viewpoint. The same texture can be used to synthesise several views. For example, $T^*_{x_0y_0}$ can be used to synthesise respectively a view $S_{x_1y_0}$ and a view $S_{x_2y_0}$ corresponding respectively to the same viewpoint as the source textures $T_{x_1y_0}$ and $T_{x_2y_0}$.

In this case, the joint distortion takes into account the error calculated between $S_{x_1y_0}$ and its source texture $T_{x_1y_0}$ and the error calculated between $S_{x_2y_0}$ and its source texture $T_{x_2y_0}$.

In this case, the encoder COD makes a common decision for all views. For example, if the compression is done image by image, i.e. the encoding decision is made at the image level instead of a block level in the image, there are N possible encoding decisions, with $N=N_1 \times N_2 \times \ldots \times N_K$, K being the number of views to be encoded, and $N_i$ being the number of possible encoding decisions for the view i (1≤i≤K).

Among all these possible encoding decisions, the encoder selects the encoding that offers the best bit rate/distortion compromise.

In each round of the rate/distortion optimisation, the textures are encoded and reconstructed and the synthesis data is extracted from the reconstructed textures.

Figure 11:
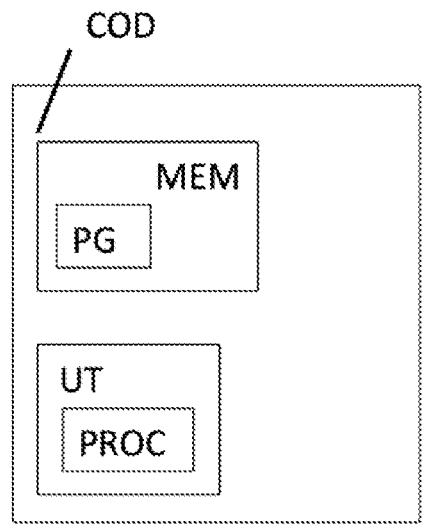
FIG. 11 illustrates a multi-view video encoding device according to a particular embodiment of the invention.

FIG. 11 shows the simplified structure of an encoding device COD adapted to implement the encoding method according to any one of the particular embodiments of the invention previously described.

According to a particular embodiment of the invention, the steps of the encoding method are implemented by computer program instructions. For this purpose, the encoding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the encoding method as described above, when the program is executed by the processor PROC.

At initialisation, the code instructions of the computer program PG are for example loaded into an RAM memory (not shown) before being executed by the processor PROC. In particular, the processor PROC of the processing unit UT implements the steps of the encoding method described above, according to the instructions of the computer program PG.

Figure 12:
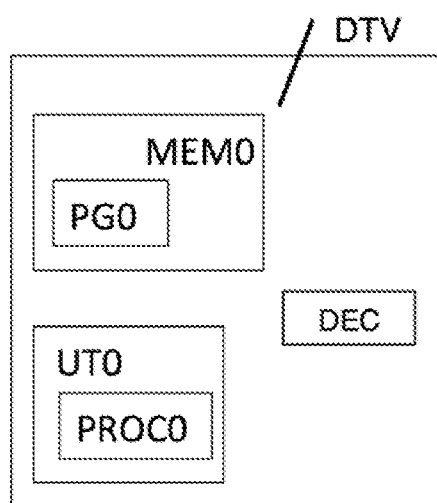
FIG. 12 illustrates a device for processing multi-view video data according to a particular embodiment of the invention.

FIG. 12 shows the simplified structure of a device for processing multi-view video data DTV adapted to implement the method for processing multi-view data according to any one of the particular embodiments of the invention previously described.

According to a particular embodiment of the invention, the device for processing multi-view video data DTV has the standard architecture of a computer and notably comprises a memory MEM0, a processing unit UT0, equipped for example with a processor PROC0, and driven by the computer program PG0 stored in the memory MEM0. The computer program PG0 comprises instructions for implementing the steps of the method for processing multi-view video data as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UT0 implements the steps of the method for processing multi-view video data described above, according to the instructions of the computer program PG0.

According to a particular embodiment of the invention, the device for processing multi-view video data DTV comprises a decoder DEC adapted to decode one or more encoded data streams representative of a multi-view video.

The invention claimed is:

1. A method for processing multi-view video data, the processing method being implemented by processing device and comprising:
   obtaining at least one part of a decoded texture image of at least one view of the multi-view video, from a decoding device that has received and decoded an encoded data stream representative of the multi-view video, the encoded data stream containing no depth map data:
   extracting at least one part of a depth map from at least said one part of the decoded texture image, referred to as synthesis data, and
   synthesizing at least one image of an intermediate view of the multi-view video not encoded in said encoded data stream, from at least said one part of the decoded texture image and from said synthesis data obtained.

2. The data processing method according to claim 1, comprising decoding from the encoded data stream at least one item of data that enables modification of the synthesis data obtained or to control the obtaining of the synthesis data.

3. The method for processing multi-view video data according to claim 1, wherein the synthesis data is obtained using a neural network.

4. The method for processing multi-view video data according to claim 2, wherein the at least one item of data decoded from the encoded data stream comprises refinement data of said synthesis data, and the method further comprises modifying said synthesis data from said decoded refinement data.

5. The method for processing multi-view video data according to claim 4, wherein the synthesis data is modified by adding the refinement data to the synthesis data.

6. The method for processing multi-view video data according to claim 2, wherein the at least one item of data decoded from the encoded data stream comprises a control parameter, the method further comprising applying said control parameter when obtaining said synthesis data.

7. The method for processing multi-view video data according to claim 1, wherein obtaining the synthesis data comprises:
   modifying said synthesis data obtained using a neural network.

8. The method for processing multi-view video data according to claim 7, wherein the at least one item of data decoded from the encoded data stream comprises a control parameter, which corresponds to an update parameter of said neural network used to modify said synthesis data, the method further comprising applying said control parameter when obtaining said synthesis data.

9. The method for processing multi-view video data according to claim 1, wherein said encoded data stream comprises refinement data, the method further comprising:
   obtaining refinement data from said decoding device having received and decoded said encoded data stream;
   modifying the synthesis data with said refinement data so as to obtain at least one refined depth map part as said synthesis data; and
   synthesizing at least one image of an intermediate view being from the modified synthesis data.

10. An apparatus comprising a processing device for processing multi-view video data, wherein the processing device comprises:
   a processor and a memory configured to:
   obtain at least one part of a decoded texture image of at least one view of the multi-view video, from a decoding device that has received and decoded an encoded data stream representative of the multi-view video, the encoded data stream containing no depth map data,
   extract at least one part of a depth map from at least said one part of the decoded texture image, referred to as synthesis data, and
   synthesize at least one image of an intermediate view of the multi-view video not encoded in said encoded data stream, from at least said one part of the decoded texture image and from said synthesis data obtained.

11. A terminal comprising the processing device according to claim 10.

12. The apparatus according to claim 10, wherein the apparatus comprises the decoding device.

13. A non-transitory computer-readable storage medium, comprising instructions of a computer program which when executed by a processor of a processing device configure the processing device to implement a method for processing multi-view video data, comprising:
   obtaining at least one part of a decoded texture image of at least one view of the multi-view video, from a decoding device that has received and decoded an encoded data stream representative of the multi-view video, the encoded data stream containing no depth map data,
   extracting at least one part of a depth map from at least said one part of the decoded texture image, referred to as synthesis data, and
   synthesizing at least one image of an intermediate view of the multi-view video not encoded in said encoded data stream, from at least said one part of the decoded texture image and from said synthesis data obtained.

\* \* \* \* \*